US010876586B2

(12) United States Patent
Jungmann et al.

(10) Patent No.: US 10,876,586 B2
(45) Date of Patent: Dec. 29, 2020

(54) DISK BRAKE, IN PARTICULAR FOR COMMERCIAL VEHICLES

(71) Applicant: WABCO Europe BVBA, Brussels (BE)

(72) Inventors: Hans-Christian Jungmann, Gorxheimertal (DE); Martin Stumpf, Lampertheim (DE)

(73) Assignee: WABCO EUROPE BVBA, Brussels (BE)

( * ) Notice: Subject to any disclaimer, the term of this patent is extended or adjusted under 35 U.S.C. 154(b) by 61 days.

(21) Appl. No.: 15/767,142

(22) PCT Filed: Sep. 6, 2016

(86) PCT No.: PCT/EP2016/001503
§ 371 (c)(1),
(2) Date: Apr. 10, 2018

(87) PCT Pub. No.: WO2017/063726
PCT Pub. Date: Apr. 20, 2017

(65) Prior Publication Data
US 2019/0072146 A1 Mar. 7, 2019

(30) Foreign Application Priority Data
Oct. 12, 2015 (DE) .................. 10 2015 013 240

(51) Int. Cl.
*F16D 65/18* (2006.01)
*F16D 65/56* (2006.01)
(Continued)

(52) U.S. Cl.
CPC ........... *F16D 65/18* (2013.01); *F16D 65/567* (2013.01); *F16D 66/025* (2013.01);
(Continued)

(58) Field of Classification Search
CPC .... F16D 65/18; F16D 65/567; F16D 2121/14; F16D 65/568; F16D 2055/0095;
(Continued)

(56) References Cited

U.S. PATENT DOCUMENTS 4,804,073 A * 2/1989 Taig ...................... B60T 13/741
188/72.1
4,995,483 A * 2/1991 Moseley ................ B60T 8/325
188/162

(Continued)

FOREIGN PATENT DOCUMENTS

DE 4312377 A1 10/1993
DE 10260597 A1 7/2004
(Continued)

*Primary Examiner* — Bradley T King
*Assistant Examiner* — Mahbubur Rashid
(74) *Attorney, Agent, or Firm* — Leydig, Voit & Mayer, Ltd.

(57) ABSTRACT

A disk brake includes a wear sensor and an adjusting device having an adjusting element in the form of a pressure screw and/or a pressure sleeve. The adjusting element has a recess in which a reset device extends which is rotationally coupled to the adjusting element for resetting the adjusting device. The wear sensor lies at least partially in the recess.

20 Claims, 5 Drawing Sheets

(51) Int. Cl.
*F16D 66/02* (2006.01)
*F16D 121/14* (2012.01)
*F16D 125/26* (2012.01)
*F16D 125/32* (2012.01)
*F16D 125/64* (2012.01)

(52) U.S. Cl.
CPC ...... *F16D 2121/14* (2013.01); *F16D 2125/26* (2013.01); *F16D 2125/32* (2013.01); *F16D 2125/64* (2013.01)

(58) Field of Classification Search
CPC .......... F16D 65/56; F16D 65/46; F16D 65/54; F16D 2066/005; F16D 2125/48; F16D 66/025; F16D 66/026
See application file for complete search history.

(56) References Cited

U.S. PATENT DOCUMENTS

| | | | | |
|---|---|---|---|---|
| 5,410,293 A * | 4/1995 | Angerfors | ............. | F16D 66/025 188/1.11 L |
| 6,129,183 A * | 10/2000 | Ward | ................... | F16D 65/183 188/1.11 L |
| 6,276,494 B1 * | 8/2001 | Ward | ................... | F16D 65/183 188/1.11 L |
| 6,397,977 B1 * | 6/2002 | Ward | .................... | F16D 55/227 188/1.11 E |
| 7,322,447 B2 * | 1/2008 | Deckhut | ................. | F16D 65/18 188/1.11 L |
| 7,555,375 B2 * | 6/2009 | Pettersson | ............ | B60T 17/221 188/1.11 L |
| 9,168,905 B2 * | 10/2015 | Welin | .................... | F16D 66/027 |
| 2005/0121265 A1 | 6/2005 | Deckhut et al. | | |
| 2006/0149440 A1 * | 7/2006 | Pettersson | ............ | B60T 17/221 701/34.4 |
| 2013/0008749 A1 * | 1/2013 | Sandberg | ............. | F16D 55/227 188/71.8 |
| 2013/0139580 A1 | 6/2013 | Helf | | |
| 2014/0345985 A1 | 11/2014 | Miller | | |
| 2014/0353094 A1 * | 12/2014 | Welin | ..................... | B60T 17/22 188/18 A |
| 2015/0070003 A1 * | 3/2015 | Elliott | .................... | B60T 8/368 324/207.15 |

FOREIGN PATENT DOCUMENTS

| | | |
|---|---|---|
| DE | 10356801 B3 | 5/2005 |
| DE | 102012002731 A1 | 8/2013 |
| DE | 102012008573 A1 | 10/2013 |
| EP | 2598767 B1 | 6/2014 |
| WO | WO 2013124247 A1 | 8/2013 |

* cited by examiner

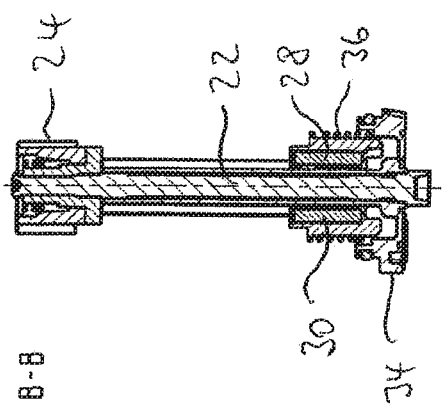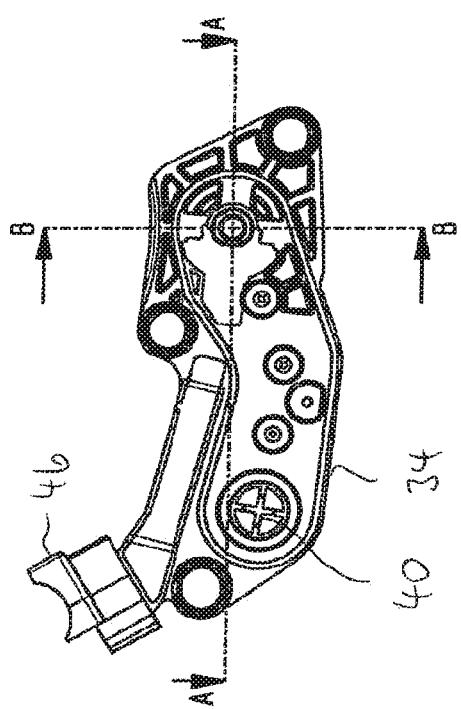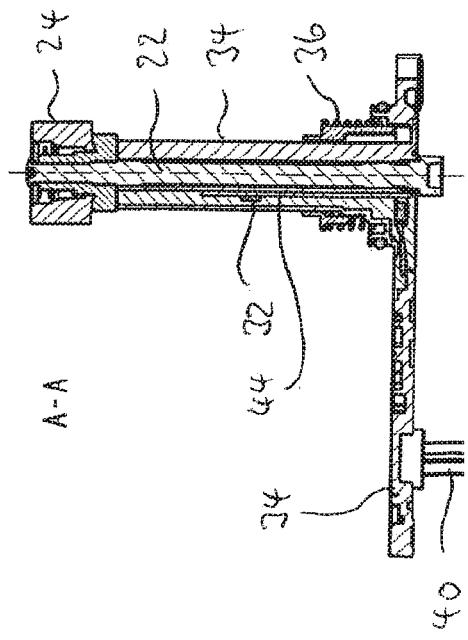
Fig 5

DISK BRAKE, IN PARTICULAR FOR COMMERCIAL VEHICLES

CROSS REFERENCE TO RELATED APPLICATIONS

This application is a U.S. National Stage Application under 35 U.S.C. § 371 of International Application No. PCT/EP2016/001503 filed on Sep. 6, 2016, and claims benefit to German Patent Application No. DE 10 2015 013 240.7 filed on Oct. 12, 2015. The International Application was published in German on Apr. 20, 2017, as WO 2017/063726 A1 under PCT Article 21(2).

FIELD

The invention concerns a disk brake, in particular for commercial vehicles, with a wear sensor and a reset device which has a reset element in the form of a pressure screw and/or a pressure sleeve.

BACKGROUND

Disk brakes of the type described above are known, for example from DE 43 12 377 A1. The disk brake is a floating caliper disk brake. The sensor is here arranged inside a recess in the caliper. Forming such a recess is complex and cost-intensive.

SUMMARY

In an embodiment, the present invention provides a disk brake. The disk brake includes a wear sensor and an adjusting device having an adjusting element in the form of a pressure screw and/or a pressure sleeve. The adjusting element has a recess in which a reset device extends which is rotationally coupled to the adjusting element for resetting the adjusting device. The wear sensor lies at least partially in the recess.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 is diagrammatic, partially sectional views of parts of the structural unit according to FIG. 3.

DETAILED DESCRIPTION

Figure 1:
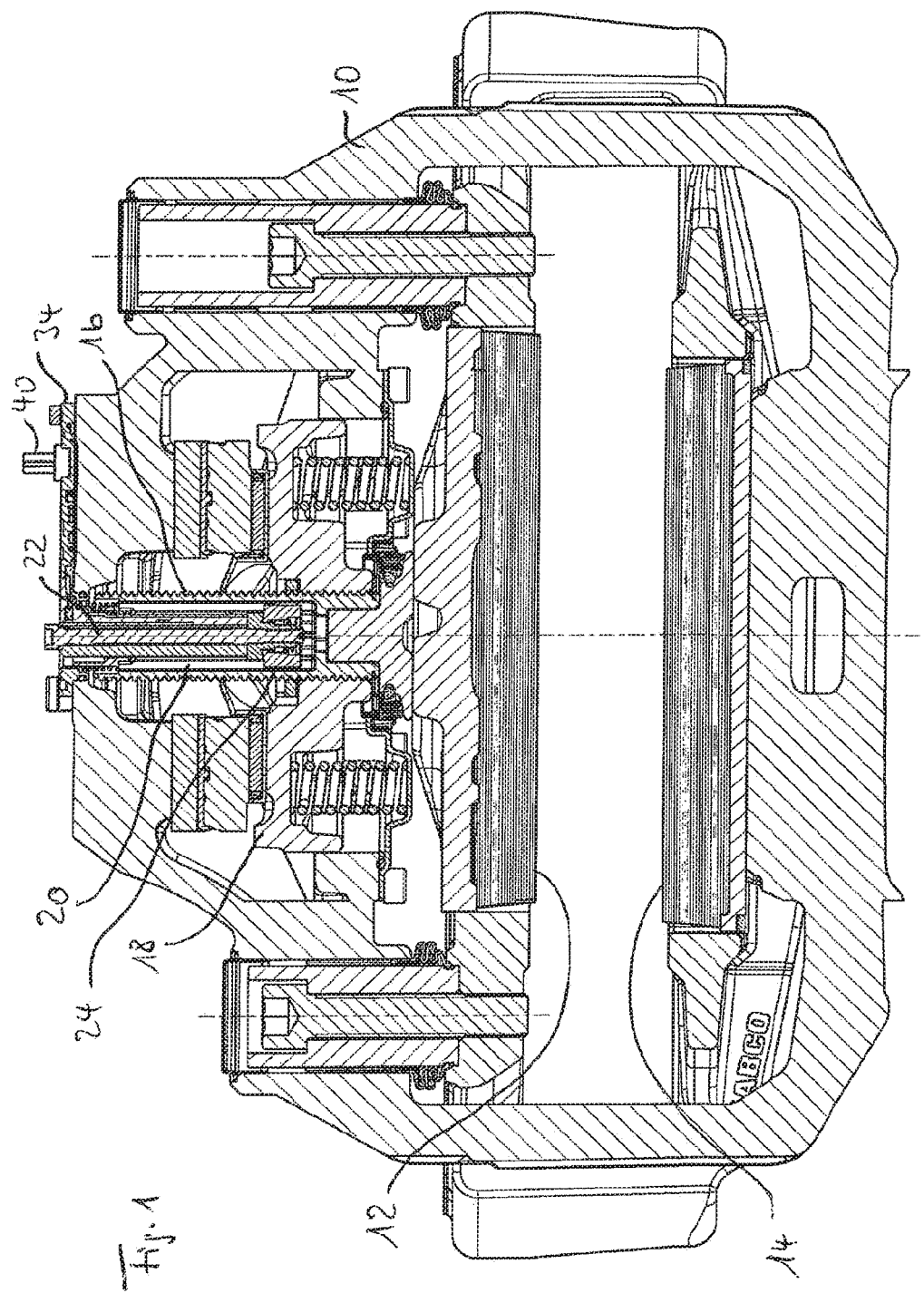
FIG. 1 is a diagrammatic sectional depiction of a disk brake according to an embodiment of the invention.

Embodiments of the invention provide disk brakes having reduced complexity and reduced costs.

Embodiments of the invention provide disk brakes, in particular for commercial vehicles, with a wear sensor and a reset device which has a reset element in the form of a pressure screw and/or a pressure sleeve, wherein the reset element has a recess in which a reset device extends which is rotationally coupled to the adjusting element for resetting the adjusting device. According to one or more embodiments of the invention, a wear sensor lies at least partially in the recess.

It is particularly simple, straightforward and economic to accommodate the wear sensor (at least partially) in the recess which is in any case provided in the adjusting element and serves to receive the reset device.

WO 2013/124247 A1 discloses a disk brake in which both a reset device and a wear sensor lie not inside an adjusting element, but rather next to it.

The same applies to EP 2 598 767 B1. This too discloses a brake wear sensor of the disk brake which is indeed coupled to an adjusting device via a drive element, but does not lie inside a recess in the adjusting element.

Pad wear can be sensed in any fashion according to embodiments of the invention. It is however preferred that the adjusting element moves axially on adjustment and the wear sensor is a linear sensor which detects the axial position of the adjusting element. This embodiment is not only particularly precise because no translation of axial movements into rotational movements (or conversely) is required. Because of the detection of the axial displacement of the adjusting element, it is also possible for the wear sensor to determine not only the wear but also the braking stroke.

According to a particularly preferred embodiment, the wear sensor is a sensor which has a Hall effect probe. This is a particularly simple embodiment of a sensor for determining an axial movement.

According to an embodiment of the invention, a reset shoulder is provided which is rotationally coupled to the reset device via a gear mechanism. This embodiment allows the location at which the brake is reset, i.e. the location at which for example a reset tool is applied, to be placed away from the region behind the adjusting device or adjusting element, because it is known from experience that little space is available there.

According to an embodiment of the invention, the reset shoulder is designed for application of a reset tool. In this embodiment, the reset tool (for example a screw driver) may be applied in a region in which there is sufficient space to perform the reset without disturbance.

According to a particularly preferred embodiment of the invention, a holding device is provided which holds the wear sensor and extends into the recess. In other words, not only the wear sensor but also its holding device lies (at least partially) in the recess of the adjusting element. This saves space.

According to an embodiment of the invention, the holding device is mounted in the brake caliper. Such a mounting can be achieved without great complexity, and also need not fulfill high demands for precision, in contrast for example to the mounting of moving parts.

Further preferably, not only the wear sensor but also the reset device is held by the holding device. This avoids mounting of the reset device in the caliper and hence the expense of forming such a mounting. Such a mounting is namely associated with machining of the brake caliper. This may now be omitted.

Finally, according to an embodiment of the invention, the holding device, the wear sensor, the reset device, the gear mechanism and the reset shoulder form one structural unit. In this way, said elements and assemblies, namely the holding device, the wear sensor, the reset device, the gear mechanism and the reset shoulder, may be mounted in a single work process, which substantially reduces the work involved. If the reset can be performed directly at the reset device, the structural unit may also be formed without the gear mechanism and the reset shoulder.

Figure 2:
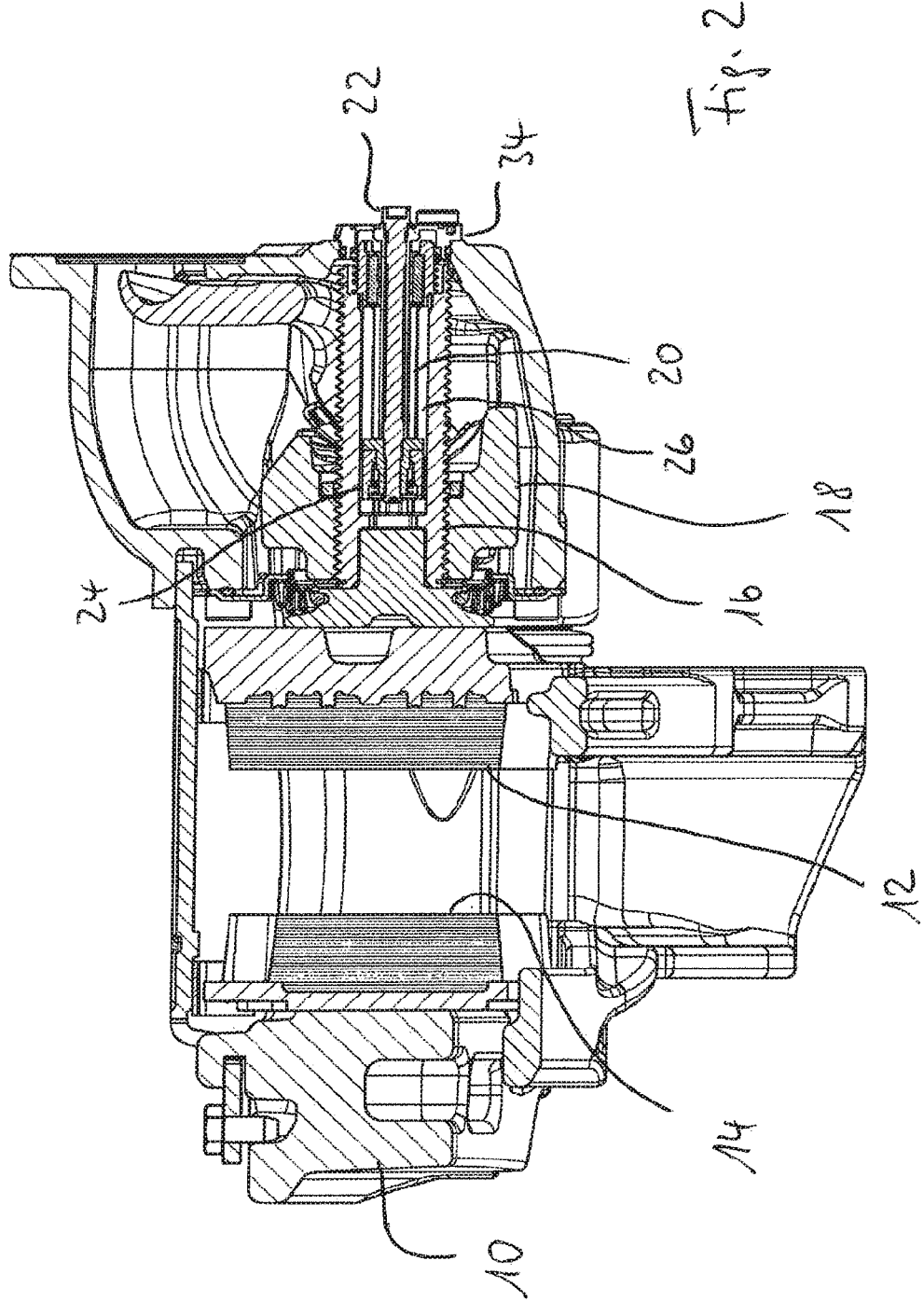
FIG. 2 is a sectional side view of the disk brake of FIG. 1.
Figure 3:
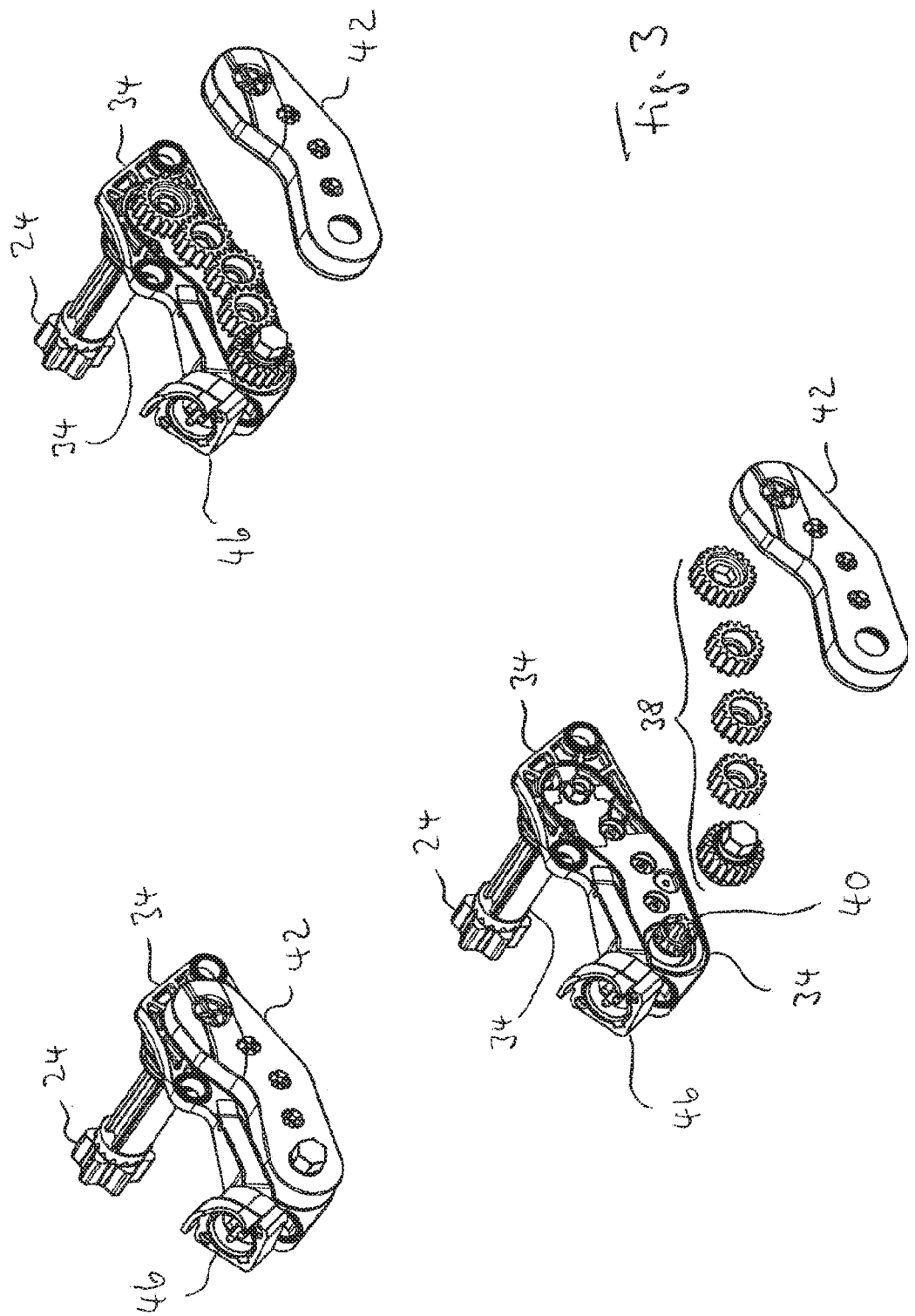
FIG. 3 is diagrammatic, partially exploded, perspective views of a structural unit of the disk brake of FIGS. 1 and 2.
Figure 4:
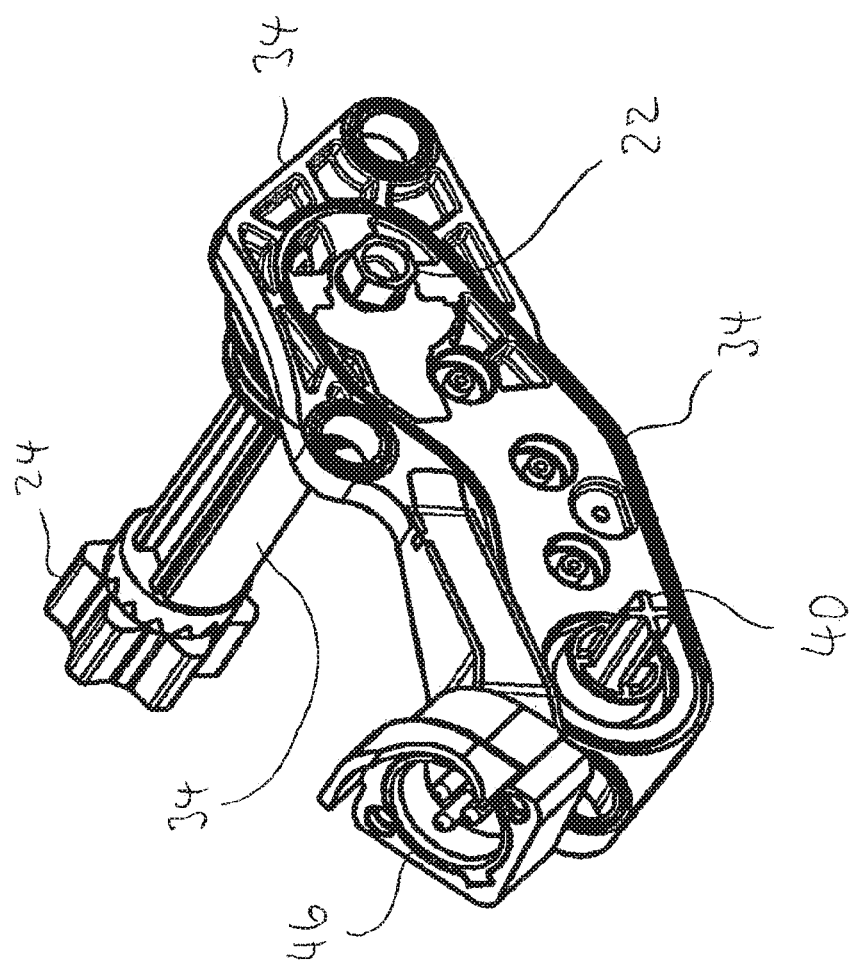
FIG. 4 is an enlarged partial view of FIG. 3.

The disk brake shown in the drawings comprises a floating caliper 10 because it is a floating caliper disk brake. As the wear on the brake pads 12, 14 increases, the floating caliper 10 moves up in FIG. 1, or to the right in FIG. 2. An adjusting device ensures that nonetheless a predefined air gap is retained between the brake pads 12, 14 and a brake disk (not shown in the drawing). The adjusting device includes a pressure screw 16 which is screwed to a pressure sleeve 18 and is turned to adjust the brake.

The pressure screw 16 has a recess 20 in which a reset device 22 in the form of a reset shaft extends. On its working end, the reset device 22 carries a multisided head 24 which couples it rotationally to the pressure screw 16, because the recess 20 has longitudinal webs 26 corresponding to the multisided contour of the multisided head 24. The pressure screw 16 can be set back, for example for a pad change, by turning the reset device 22.

A wear sensor, which includes magnets 28, 30 and a Hall effect sensor 32, extends into the recess 20. The reset device 22, the magnets 28, 30 and the Hall effect sensor 32 are held by a holding device 34 which extends into the recess 20 of the pressure screw 16. In addition, the holding device 34 also holds a coil spring 36, which ensures that the magnets 28, 30 are coupled in the axial direction to the pressure screw 16 so that they move axially with the pressure screw 16, whereas the Hall effect sensor 32 is not axially coupled to the pressure screw 16. In this way, by sensing the axial movements of the magnets 28, 30 relative to the Hall effect sensor 32, it is possible to draw conclusions about the axial movements of the pressure screw 16. Thus not only can the wear on the brake pads 12, 14 be determined, but also the braking stroke.

The holding device 34 is for example L-shaped in the view along section A-A of FIG. 5. One leg of the L carries a gear mechanism which, in the exemplary embodiment shown in the drawing, is configured as a toothed gear mechanism, designated with reference sign 38. This gear mechanism connects a reset shoulder 40 to the reset device 22, so that the brake resetting—for example for a pad change—does not require direct application on the reset device 22, but can rather be achieved by turning the reset shoulder 40. This reset shoulder lies outside the brake axis and is not aligned with the pressure screw 16, and therefore lies in the region in which more space is available for application of a reset tool, such as a screwdriver, on the reset shoulder 40.

The holding device 34 includes a cover 42, for example for covering the gear mechanism 38. In the exemplary embodiment shown in the drawing, the holding device 34 is configured as a housing.

The Hall effect sensor 32 lies on a plate 44 which is connected via wires (not shown in the drawing) to an electrical connection 46 on the holding device 34. Via this electrical connection, the output signals of the Hall effect sensor 32 are conducted to an analysis device.

The holding device 34 is mounted in a floating caliper 10. It holds or carries the reset device 22, the magnets 28, 30, the Hall effect sensor 32 and hence the essential parts of the wear sensor, the gear mechanism 38 and the reset shoulder 40, so no mountings in the floating caliper 10 are required for all these components. Rather, by mounting the holding device 34 in the floating caliper 10, the entire structural unit is mounted without the need for complex work on the floating caliper 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Floating caliper
12 Brake pad
14 Brake pad
16 Pressure screw
18 Pressure sleeve
20 Recess
22 Reset device
24 Multisided head
26 Longitudinal web
28 Magnet
30 Magnet
32 Hall effect sensor
34 Holding device
36 Coil spring
38 Gear mechanism
40 Reset shoulder
42 Cover
44 Plate
46 Electrical connection

The invention claimed is:

1. A disk brake, comprising:
a wear sensor; and
an adjusting device having an adjusting element in the form of a pressure screw and/or a pressure sleeve,
wherein the adjusting element has a recess in which a reset device extends,
wherein the reset device is rotationally coupled to the adjusting element for resetting the adjusting device,
wherein the reset device is coaxial with the adjusting element, and wherein at least a portion of the wear sensor lies in the recess and between the reset device and the adjusting element.

2. The disk brake as claimed in claim 1, wherein the reset device, the recess, and the adjusting element are coaxial, and wherein the wear sensor is a linear sensor which detects an axial position of the adjusting element.

3. The disk brake as claimed in claim 1, wherein the wear sensor includes a Hall effect sensor.

4. The disk brake as claimed in claim 1, further comprising a reset shoulder rotationally coupled to the reset device via a gear mechanism.

5. The disk brake as claimed in claim 4, wherein the reset shoulder is designed for application of a reset tool.

6. The disk brake as claimed in claim 1, further comprising a holding device that holds the wear sensor and extends into the recess.

7. The disk brake as claimed in claim 6, further comprising a brake caliper, wherein the holding device is mounted in the brake caliper.

8. The disk brake as claimed in claim 6, wherein the reset device is held by the holding device.

9. The disk brake as claimed in claim 6, wherein the holding device, the wear sensor, the reset device, the gear mechanism, and the reset shoulder form one structural unit.

10. The disk brake as claimed in claim 1, further comprising brake pads and a brake disk,
wherein the adjusting device comprises the pressure screw and the pressure sleeve and is configured to adjust an axial position of at least one brake pad to ensure that a predetermined air gap is maintained between the brake pads and the brake disk.

11. The disk brake as claimed in claim 10, wherein the reset device comprises an axially extending shaft and a multisided head, the multisided head being keyed into the pressure screw thereby enabling the reset device to rotate the pressure screw.

12. The disk brake as claimed in claim 11, wherein the adjusting element is in the form of the pressure screw, the at least a portion of the wear sensor comprises one or more magnets, and the disk brake further comprises:
one or more coil springs configured to axially couple the one or more magnets with the pressure screw.

13. The disk brake as claimed in claim 11, wherein the wear sensor comprises a stationary Hall effect sensor and one or more movable magnets;
the disk brake further comprising a holding device to which the Hall effect sensor and a coil spring are mounted,
wherein the coil spring is configured to cause the one or more magnets to move axially with the pressure screw.

14. The disk brake as claimed in claim 1, wherein the wear sensor comprises a stationary Hall effect sensor and one or more movable magnets;
the disk brake further comprising a holding device to which the stationary Hall effect sensor and a coil spring are mounted,
wherein the coil spring is configured to cause the one or more magnets to move axially with the pressure screw and is at least partially disposed within the recess.

15. A disk brake, comprising:
a brake pad;
a wear sensor;
an adjusting device comprising a pressure screw and a pressure sleeve, the adjusting device being configured to adjust an axial position of the brake pad; and
a reset device rotationally coupled to the pressure screw and configured to reset an axial position of the adjusting device, the reset device being coaxial with the pressure screw;
wherein a recess, through which the reset device extends, is disposed in an interior of the pressure screw and the pressure sleeve, and
wherein at least a portion of the wear sensor lying lies in the recess and between the pressure screw and the reset device.

16. The disk brake as claimed in claim 15, wherein the at least a portion of the wear sensor comprises one or more magnets, and wherein the disk brake further comprises one or more coil springs axially coupling the one or more magnets to the pressure screw such that the one or more magnets follow axial motion of the pressure screw.

17. The disk brake as claimed in claim 16, wherein the recess comprises a bore and the reset device comprises a multi-sided head keyed into the pressure screw within the bore, and wherein the one or more coil springs are configured to press the at least a portion of the wear sensor against a shoulder of the pressure screw, the shoulder serving as an internal surface of the bore.

18. The disk brake as claimed in claim 15, wherein the at least a portion of the wear sensor comprises two magnets disposed radially intermediate the reset device and the pressure screw,
wherein the wear sensor comprises a stationary Hall effect sensor in addition to the two moveable magnets and the disk brake further comprises a holding device to which the Hall effect sensor and a coil spring are mounted, and
wherein the coil spring is configured to cause the two magnets to move axially with the pressure screw and at least a portion of the coil spring is disposed in the recess.

19. The disk brake as claimed in claim 15, wherein recess comprises a bore extending through the pressure screw, and the reset device and the pressure screw are coaxial about an axis of rotation of the pressure screw,
wherein the at least a portion of the sensor device is disposed radially outward of the axis of rotation and radially inward of an outer screw thread of the pressure screw, and
wherein a perimeter of the bore is disposed radially outward of the at least a portion of the sensor device with respect to the axis of rotation.

20. The disk brake as claimed in claim 19, further comprising a coil spring disposed within the bore,
wherein the at least a portion of the sensor device comprises one or more magnets and the coil spring is disposed radially outward of the one or more magnets.

* * * * *